Patented Oct. 1, 1940

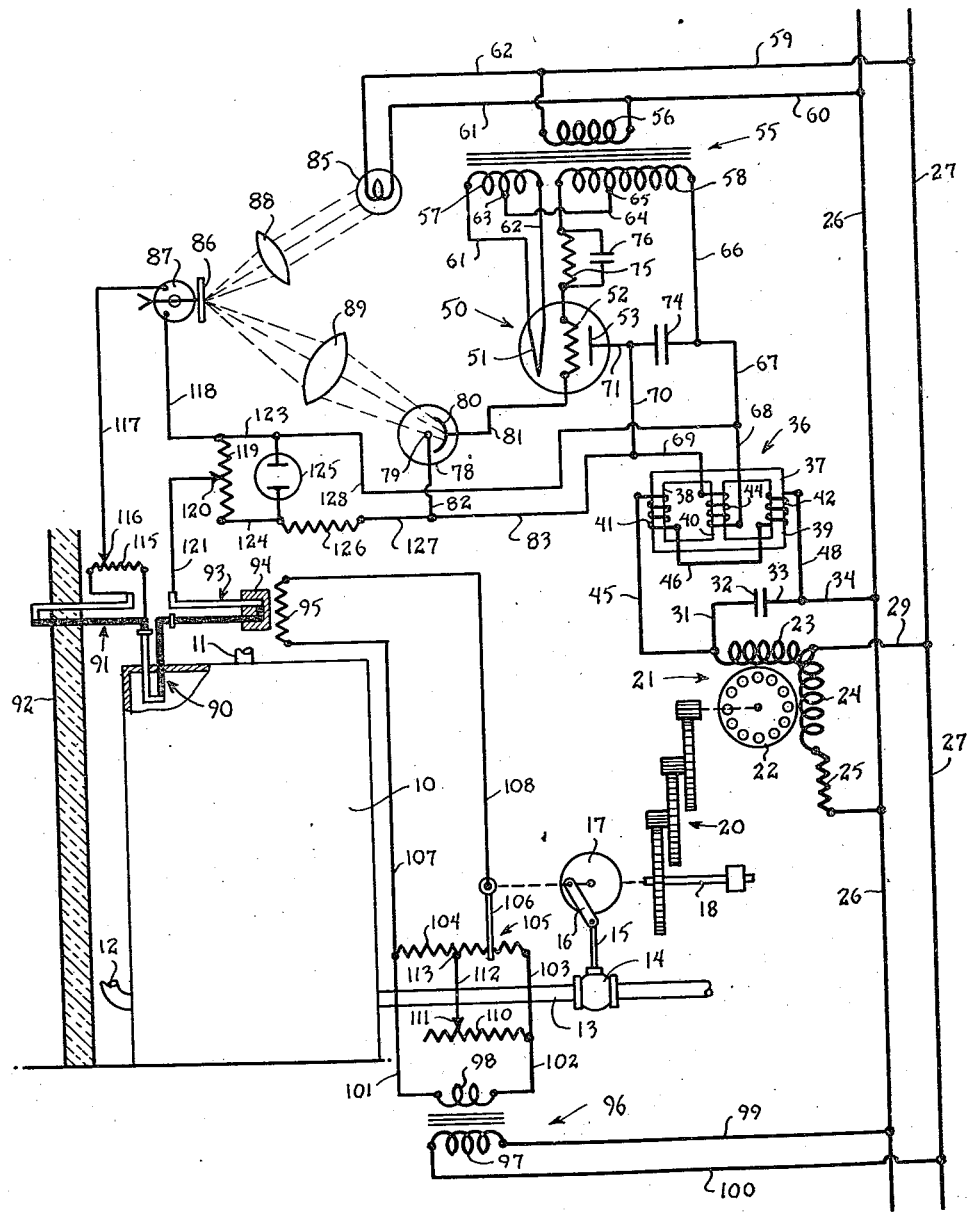

2,216,301

UNITED STATES PATENT OFFICE 2,216,301

TEMPERATURE CONTROL SYSTEM

Hubert T. Sparrow, Minneapolis, Minn., assignor to Minneapolis-Honeywell Regulator Company, Minneapolis, Minn., a corporation of Delaware Application November 21, 1938, Serial No. 241,584

11 Claims. (Cl. 236—74)

The present invention relates to a temperature control system and more particularly to one of the follow-up type.

Temperature control systems are quite common in which the temperature regulating device is caused to assume any one of a number of positions corresponding to the value of the temperature to which the main controller is subjected rather than to be moved merely between two extreme positions. One common form of such a system is one in which a temperature sensitive element such as bimetal is employed to actuate a slider of a control potentiometer and this control potentiometer together with a similar follow-up potentiometer controls the operation of a motor positioning the temperature regulating device. In this system, the motor, upon movement of the slider of the control potentiometer, moves the regulating device and positions the slider of the follow-up potentiometer in such a direction as to oppose the effect of the change in the control potentiometer.

One difficulty of the above described type of system is that the temperature responsive potentiometer is inherently relatively bulky and consequently cannot be as inconspicuous as might be desirable. Another difficulty is that the type of potentiometer that is practical for this purpose is limited as to the number of positions it can assume with the result that the system is also so limited. A further difficulty arises where it is desired to control in accordance with more than one condition. The use of more than one control potentiometer introduces various problems in connection with the control circuit. For these and other reasons, this type of system is not as widely used as would be assumed in view of its many advantages.

An object of the present invention is to provide such a temperature control system in which not only the main controller but also the follow-up controller consists of a current generating device whose output varies with the temperature to which it is subjected and in which the balancing is accomplished by heating the balancing control in accordance with the position of the temperature regulating device.

A further object of the invention is to provide such a system in which said current generating devices are thermo-couples.

A still further object of the invention is to provide such a system in which means are provided for retarding the heat absorption and dissipation of the follow-up controller so that the temperature regulating device is initially moved too far and then moved back as the heat change effects the follow-up controller.

A still further object of the invention is to provide such a system in which the thermo-couples are connected in series with a source of adjustable direct current voltage in the input circuit of a space discharge amplifier whose output controls the operation of a motor positioning the temperature regulating device and in which the direct current voltage is derived from a gaseous discharge device connected across the output circuit of the amplifier.

Other objects of the invention will be apparent from a consideration of the accompanying specification, claims, and drawing.

In the single figure of the drawing, the temperature control system of the present invention is shown in schematic form. For purposes of illustration, the system is shown in connection with a gas fired hot water boiler which is controlled in accordance with boiler water temperature and outdoor temperature.

Referring specifically to the drawing, the reference numeral 10 is used to designate a hot water boiler having delivery and return pipes 11 and 12, respectively. The gas for the burner (not shown) is supplied through a pipe 13, the flow of gas being controlled by a valve 14.

The valve 14 is provided with a valve stem 15 which is connected by a crank 16 to a crank disc 17 secured to a shaft 18. The shaft 18, which is shown in part in dotted lines, is connected through a reduction gear train 20 to an induction motor 21.

The induction motor 21 comprises a rotor 22 which may be of the squirrel cage type and a pair of field windings 23 and 24. One terminal of field winding 24 is connected in series with a resistance 25 to line wires 26 and 27 leading to a suitable source of power (not shown). The energization of field winding 24 is thus constant and, neglecting the inductive effect of the winding, in phase with the supply voltage. One terminal of field winding 23 is connected by conductor 29 to the line wire 27. The other terminal is connected to line wire 26 by either of two conductive paths. One of these paths includes the conductor 31, the condenser 32, and conductors 33 and 34.

The other path includes the alternating current windings of a saturable core amplifier 36. The saturable core amplifier 36 comprises a magnet core structure 37 which is provided with two end legs 38 and 39 and an intermediate leg 40. Located on the two end legs 38 and 39 are windings 41 and 42. These windings are used as alternating current windings and together with the core structure constitute a reactance. The amount of this reactance is determined by the energization of a saturating winding 44 on the intermediate leg, which winding is energized by direct current. The alternating windings 41 and 42 are oppositely wound so that no alternating current flux flows through the leg 40 and accordingly no alternating voltage is induced in winding 44. The connection between the field winding 23 and line wire 26 including the windings 41 and 42 is as follows: from field winding 23 through conductor 45, winding 41, conductor 46, winding 42, and conductors 48 and 34.

The energization of the saturating winding 44 is controlled by a thermionic space discharge amplifier 50. This amplifier is shown for purposes of illustration as being in the form of a three electrode vacuum tube comprising a filament cathode 51, a grid 52, and an anode 53.

Power for the operation of the vacuum tube is supplied by a combination step-up, step-down transformer 55. This transformer comprises a line voltage primary 56, a low voltage secondary 57, and a high voltage secondary 58. The line voltage primary 56 is connected by line wires 59 and 60 to the line wires 26 and 27. The low voltage secondary 57 is connected by conductors 61 and 62 to the two terminals of the filament and is employed for heating the filament 51. The secondary 57 is center-tapped in the usual manner at 63 and this center tap is connected by conductor 64 to a tap 65 of the secondary 58. The cathode 51 is thus at the potential of tap 65. The right-hand end of secondary 58 is connected by conductors 66, 67 and 68, saturating winding 44, and conductors 69, 70, and 71 to the anode 53. The portion of secondary 58 between tap 65 and the right-hand end thereof is thus connected in the output circuit of the two. A condenser 74 is connected between conductors 71 and 67 so as to be in parallel with the saturating winding 44. The condenser 74 is a filter condenser to smooth out the rectified output of the tube 50. A grid bias is provided by a resistor 75, which is shunted by a condenser 76. The resistance 75 and condenser 76 are connected between the grid 52 and the left-hand terminal of secondary 58. The bias provided by the rectified voltage between the left-hand terminal of secondary 58 and tap 65 tends to bias the grid below the cut-off point of the tube.

A photo-electric cell is designated by the reference numeral 78. This photo-electric cell is of the conventional electronic emissive type and comprises an anode 79 and a cathode 80. The cathode is connected by conductor 81 to the grid 52 and the anode 79 is connected by conductors 82, 83, 70, and 71 to the anode 53 of tube 50. It will be obvious from the above that the photo-electric cell is included in a connection between the grid 52 and the anode 53 and that as the conductivity thereof is increased the potential of the grid will become near that of the anode and will thus be raised with respect to the cathode.

An ordinary incandescent lamp 85 is provided for the purpose of variably illuminating the photo-electric cell 78. The lamp is energized by the following circuit: from line wire 26 through conductors 60 and 61, lamp 85, and conductors 62 and 59.

The light from lamp 85 is directed onto the photo-electric cell 78 by means of a mirror 86 which is positioned by a galvanometer 87. A lens 88 is interposed between the lamp 85 and the mirror 86. A second lens 89 is interposed between the mirror 86 and the photo-electric cell 78, these lenses being provided to converge the light rays upon the mirror 86 and upon the photo-electric cell 78, respectively. It will be obvious that if the position of mirror 86 is varied, the amount of light from lamp 85 which is reflected onto the photo-electric cell 78 will be varied. As shown in the drawing, the light is directed to one side of the center point of the cathode 80. Thus upon movement of the galvanometer in one direction, the light received by the photo-electric cell will be increased. Upon movement in a different direction the light will be decreased.

The energization of galvanometer 87 is controlled by a plurality of thermo-couples, which thermo-couples form the control and balancing thermo-couples previously referred to. The reference numeral 90 is employed to designate the thermo-couple whose hot junction is located in the boiler water of boiler 10. The reference numeral 91 is used to indicate a compensating thermo-couple which projects through the wall 92 of the building so that the outer junction thereof is exposed to outside temperature. A third thermo-couple 93 is employed as a balancing controller. Surrounding the hot junction of this thermo-couple 93 is a block of heat insulating or heat retaining material. Also located adjacent to the hot junction of thermo-couple 93 is an electric heater 95. The electric heater 95 serves to heat the hot junction of thermo-couple 93. When the heating effect of heater 95 is changed, the temperature of the hot junction of the thermo-couple 93 is not immediately changed due to the delay caused by the block 94.

The energization of heater 95 is effected by means of a step-down transformer 96. This transformer comprises a line voltage primary 97 and a low voltage secondary 98. The primary winding 97 is connected by conductors 99 and 100 to line wires 26 and 27. The secondary 98 is connected by conductors 101, 102, and 103 to the resistor 104 of a potentiometer 105. Movable over the resistor 104 is a contact arm 106 which is secured to the shaft 18. The left-hand terminal of resistor 104 is connected by conductor 107 to the lower terminal of heater 95. The contact arm 106 is connected by conductor 108 to the other terminal of heater 95. The heater 95 thus has a voltage impressed across it equal to the voltage between the left-hand end of resistor 104 and the contact arm 106. In order to vary the effect of the rebalancing action, a rheostat comprising resistor 110 and slider 111 is connected across a portion of resistor 104. The right-hand terminal of resistor 110 is connected by conductor 103 to the right-hand terminal of resistor 104 while the slider 111 is connected by conductor 112 to an intermediate tap 113 of resistor 104. It will be apparent that as the valve 15 is moved upon rotation of shaft 18, the amount of heat supplied to heater 95 is adjusted accordingly. Moreover, by adjusting the slider 111 on the resistor 110, the effect of a given movement of contact arm 106 upon the energization of heater 95 can be varied.

Connected across the two terminals of compensating potentiometer 91 is a resistor 115 associated with a slider 116. The slider 116 is connected by a conductor 117 to one terminal of galvanometer 87. The other terminal of the galvanometer 87 is connected by a conductor 118 to one terminal of a resistance 119. Associated with resistance 119 is a slider 120 which is connected by conductor 121 to the outer terminal of rebalancing thermo-couple 93. It will be noted that galvanometer 87 has connected in series with it the portion of the resistance 119 between the upper end thereof and the contact 120, the entire voltage of balancing thermo-couple 93 and control thermo-couple 90 and the portion of the voltage of the potentiometer 91 determined by the position of slider 116. Thus when slider 116 is in the extreme left position, the entire voltage of potentiometer 91 is connected in the circuit. When it is in its right-hand position, none of the voltage thereof is connected. The effect of the compensating potentiometer 91 can thus be varied by an adjustment of slider 116.

The resistor 119 and slider 120 are placed in the circuit for the purpose of providing an adjustable direct current voltage. The resistor 119 is connected by conductors 123 and 124 to the opposite terminals of a gas filled space discharge tube 125 which may be a neon tube. Such a tube has the property after the discharge has been initiated of maintaining a substantially constant voltage thereacross regardless of the current flowing therethrough. The neon tube 125 is connected in series with a resistance 126 or other suitable impedance across the output circuit of the vacuum tube in parallel with the saturating winding 44. Thus tracing the connections of tube 125 and resistance 126 with respect to winding 124, the circuit is as follows: from upper terminal of saturating winding 44 through conductors 69, 83 and 127, resistor 126, neon tube 125, and conductors 128 and 68 to the lower terminal of saturating winding 44. In view of the constant voltage property of the tube 125, any change in output voltage will be absorbed in the impedance 126 so that the voltage across tube 125 remains constant. Since the resistor 119 is connected across tube 125, this resistance has impressed upon it a constant direct voltage. Thus the resistor 119 and tap 129 provide a means for introducing an adjustable amount of direct current voltage into the circuit including the thermocouples 90, 91 and 93. This adjustable direct current voltage makes possible an adjustment of the temperature setting of the couples.

It is to be noted that the main control thermocouple 90 and the compensating thermo-couple 91 are connected so as to aid each other when the outer junctions thereof are both exposed to temperatures higher than the ambient temperature, whereas the balancing thermo-couple 93 is connected in opposition thereto. Thus upon any increase in the combined potential of thermo-couples 90 or 91, the resultant voltage applied to galvanometer 87 can be restored to its normal zero value by proper increase in the heating effect of heater 95 to in turn increase the opposing voltage generated by thermo-couple 93.

Operation

The various elements are shown in the position occupied when the boiler water temperature and the outside temperature are at values such that the valve occupies a substantially intermediate position. If the boiler water temperature drops, the electromotive force generated by thermo-couple 90 will decrease with the result that a voltage will be applied to galvanometer 87 which will be of the same polarity as the output voltage of thermo-couple 93. Upon such voltage being applied to the galvanometer 87, the latter will be deflected in a clockwise direction so as to cause the photo-electric cell 78 to receive more light from lamp 85. The result of this is that the voltage of grid 52 will be increased to increase the output current of the vacuum tube 50.

When the system is balanced, the conductivity of the photo-electric cell 78 is such that the output current of the tube 50 causes the saturating winding 44 to so affect the reactance of the saturable core amplifier that this reactance is equal to the reactance of condenser 32 so as to produce a resonant condition. Under these conditions, the winding 23 is receiving a negligible amount of current and the motor remains stationary.

When the output current of the tube is increased, however, in the manner just described, the winding 44 causes the center core 40 to become more highly saturated and thus decrease the reactance of the windings 41 and 42. The effect of this is that the capacitive reactance of condenser 32 becomes greater than the inductive reactance of windings 41 and 42 so that the winding 23 has, in effect, a condenser connected in series therewith. The motor thus functions as a capacitor motor and rotates in a direction dependent upon the relative location of the windings. The gear train is so chosen with respect to the direction of rotation of the motor that under these circumstances the shaft 18 is rotated in a clockwise direction to move valve 14 towards open position. Thus the effect of the decrease in boiler water temperature is to cause valve 14 to be moved towards open position to increase the supply of gas to the burner of the boiler.

The rotation of shaft 18 in a clockwise direction also has the effect of moving shaft 106 towards the left on resistance 104. This has as its effect a decrease in the heat supplied by heater 95. After a while, this change in heating effect will be felt at the hot junction of the thermo-couple 93 so as to cause a cooling of this junction. This, in turn, results in a decrease in the opposing voltage of thermo-couple 93 to again restore the combined voltage of the circuit to its normal zero value. As the voltage gradually is reduced to zero, the galvanometer is moved back towards the position shown in the drawing in which position the light received by the photo-electric cell is such as to cause an output current of the correct value to produce a resonant condition. As soon as this resonant condition is produced, the rotation of the motor is stopped.

In the ordinary proportioning system of the prior art, the position assumed by the valve at this point would exactly correspond to the temperature change in the hot junction of thermo-couple 90. In a temperature control system, however, this is not the most desirable operation since as quick a correction of the temperature as possible without overshooting is desired. By reason of the presence of the block 94, the effect of the change in the heat given off by heater 95 is not felt immediately at the hot junction of the thermo-couple 93. The valve thus initially runs to a considerably wider open position than that corresponding to the temperature of the thermo-couple 90. After the system is rebalanced, however, the temperature of the block will tend to become more stabilized so that still more heat will be given off, causing a voltage to be applied to galvanometer 87 in the opposite direction. This will cause a decrease in the light supplied to photo-electric cell 78 with a resultant decrease in the output of vacuum tube 50. This, in turn, will cause saturating winding 44 to be less highly energized so as to increase the reactance of windings 41 and 42. The result of this is that the reactance including the inductive reactance of windings 41 and 42 and the capacitive reactance of condenser 32 will become inductive in character causing the current through winding 23 to lag that through winding 24. The result of this is that the rotor will rotate in the opposite direction to that previously described causing the shaft 18 to be rotated in a counter-clockwise direction. Such rotation in a counter-clockwise direction results in the valve being moved towards closed position and contact arm 106 being moved to the right to increase the energization of heater 95. This increase in energization of heater 95 will tend to stop further cooling of block 94 so that a stable condition will be obtained. This further increase in temperature of block 95 may even result in a slight increase in the voltage of thermo-couple 93 and consequently in a decrease of the total voltage applied to galvanometer 87 so as to again cause the valve 14 to move towards open position. It is to be understood, however, that each succeeding operation of valve 14 will be less in magnitude so that the valve will ultimately approach a position corresponding to the temperature to which thermo-couple 90 is subjected. In other words, upon a decrease in the temperature to which thermo-couple 90 is subjected, the valve is open more widely than called for by the decrease so as to give a quick increase in the amount of heat supplied. Thereafter the valve is moved back towards the proper position and in some cases may be moved back slightly more than is necessary and then moved further again to the proper position. The advantage of this is that the needed correction in the temperature is effected much more quickly than before without overshooting.

It is to be understood that when the temperature to which thermo-couple 90 is exposed increases, the operation will be the opposite to that described in connection with a decrease of such temperature and that the operation of the system will be the same as that described above in connection with the decrease in the voltage of thermo-couple 93 beyond the balance point in the balancing process. It is to be further understood that any decrease in outside temperature will also cause the heating effect of the boiler to be increased. This is obvious from the fact that the two thermo-couples 90 and 91 are connected in series so that if the temperature adjacent the outer junction of either is decreased, a similar effect will be had. It is to be understood, however, that the exposed junction of thermo-couple 91, being located outdoors will normally be the colder of the two junctions and hence the voltage generated by thermo-couple 91 will oppose that generated by thermo-couple 90. It is desirable to be able to adjust the effect of the outdoor thermostat relative to that of the boiler water thermostat. This adjustment is effected, as previously explained, by adjusting the slider 116 to vary the portion of the voltage of thermo-couple 91 that is connected in the galvanometer circuit.

It will be noted that I have provided a new and novel temperature control system having a minimum of normally moving parts. The system, furthermore, is extremely sensitive inasmuch as the only parts requiring any differential in operation are the galvanometer 87 and the motor. In each case, this differential may be made extremely small.

While I have described the invention in connection with a temperature control system, and while this is the primary application thereof certain features of the invention are applicable generally to motor control systems, particularly those of the follow-up type. In general, while I have shown a specific embodiment of the invention for purposes of illustration, it is to be understood that the invention is to be limited only by the scope of the appended claims.

I claim as my invention:

1. In a temperature control system of the modulating follow-up type, temperature changing means, a temperature regulating device of the modulating type, a plurality of current generating devices the output of which varies with temperature, one of said devices acting as a main controller and one as a balancing controller, means for locally heating the device acting as a balancing controller proportional to the position of the regulating device, and means responsive to the combined output voltage of both of said current generating devices for varying the position of said regulating device whenever said combined voltage varies from a predetermined adjustable value.

2. In a temperature control system of the modulating follow-up type, temperature changing means, a temperature regulating device of the modulating type, a plurality of current generating devices the output of which varies with temperature, one of said devices acting as a main controller and one as a balancing controller, means for locally heating the device acting as the balancing controller proportional to the position of the regulating device, and means responsive to the combined output voltage of said current generating devices and operative when said voltage varies from a predetermined value to cause movement of said regulating device until the change in the heating effect of said heating means has caused a change in the output of said balancing controller sufficient to overcome the variation in output of the main controller which caused the change in said combined voltage.

3. In a temperature control system of the modulating follow-up type, temperature changing means, a temperature regulating device of the modulating type, a plurality of current generating devices the output of which varies with temperature, one of said devices acting as a main controller and one as a balancing controller, means for locally heating the device acting as the balancing controller proportional to the position of the regulating device, means responsive to the combined output voltage of said current generating devices and operative when said voltage varies from a predetermined value to cause movement of said regulating device until the change in the heating effect of said heating means has caused a change in the output of said balancing controller sufficient to overcome the variation in output of the main controller which caused the change in said combined voltage, and means for retarding the heat absorption and dissipation of said balancing controller whereby the temperature regulating device is initially adjusted further than necessary for the change in the temperature of the main controller and is then adjusted back towards the desired position as the heat change affects the balancing controller.

4. In a temperature responsive modulating follow-up system, a controlling thermo-couple, a balancing thermo-couple, heating means for locally heating said balancing thermo-couple, a motor, a device modulatingly positioned thereby, means responsive to the combined output voltage of both of said thermo-couples for controlling the operation of said motor, and means driven by said motor for varying the heating effect of said heating means proportional to the position of said device to maintain said combined output voltage constant.

5. In a temperature responsive modulating follow-up system, a thermo-couple responsive to a main controlling temperature, a compensating thermo-couple responsive to an auxiliary controlling temperature, a balancing thermo-couple, heating means for locally heating said balancing thermo-couple, a motor, a device modulatingly positioned thereby, means responsive to the combined output voltages of all of said thermo-couples for controlling the operation of said motor, and means driven by said motor for varying the heating effect of said heating means proportional to the position of said device to maintain said combined output voltage constant.

6. In a temperature control system of the modulating follow-up type, temperature changing means, a temperature regulating device of the modulating type, a main controlling thermo-couple, a balancing thermo-couple, means for locally heating the hot junction of the balancing thermo-couple proportional to the position of the regulating device, and means responsive to the combined output voltage of said thermo-couples and operative when said voltage varies from a predetermined value to cause movement of said regulating device until the change in the heating effect of said heating means has caused a change in the output of said balancing thermo-couple sufficient to overcome the variation in output of the main controlling thermo-couple which caused the change in said combined voltage.

7. In a temperature control system of the modulating follow-up type, temperature changing means, a temperature regulating device of the modulating type, a main controlling thermo-couple, a balancing thermo-couple, means for locally heating the hot junction of the balancing thermo-couple proportional to the position of the regulating device, means responsive to the combined output voltage of said thermo-couples and operative when said voltage varies from a predetermined value to cause movement of said regulating device until the change in the heating effect of said heating means has caused a change in the output of said balancing thermo-couple sufficient to overcome the variation in output of the main controlling thermo-couple which caused the change in said combined voltage, and means for retarding the heat absorption and dissipation of said balancing thermo-couple whereby the temperature regulating device is initially adjusted further than necessary for the change in the temperature of the main controlling thermo-couple and is then adjusted back towards the desired position as the heat change affects the balancing controller.

8. In a temperature responsive follow-up system, a motor, electrically operated means for controlling said motor, a grid controlled space discharge tube, a source of power, means for connecting said motor controlling means and a portion of said source of power in series in the output circuit of said tube so that the operation of the motor is varied in accordance with the output of the tube, an input circuit to said tube, voltage responsive means operative to vary the voltage applied to said input circuit, a gaseous discharge device connected in series with an impedance across said output circuit, said gaseous discharge device being of a type having a uniform potential drop thereacross regardless of the current flow therethrough, a thermo-couple, and means for applying to said voltage responsive means the resultant of the thermo-couple voltage and an adjustable portion of the constant direct current voltage across said gaseous discharge device whereby the voltage applied to the grid is dependent upon the thermo-couple voltage.

9. In a temperature responsive follow-up system, a motor, electrically operated means for controlling said motor, a grid controlled space discharge tube, a source of power, means for connecting said motor controlling means and a portion of said source of power in series in the output circuit of said tube so that the operation of the motor is varied in accordance with the output of the tube, an input circuit to said tube, voltage responsive means operative to vary the voltage applied to said input circuit, a gaseous discharge device connected in series with an impedance across said output circuit, said gaseous discharge device being of a type having a uniform potential drop thereacross regardless of the current flow therethrough, a control thermo-couple, a balancing thermo-couple, a heater for said balancing thermo-couple, means controlled by said motor for varying the heating effect of said heater, and means for applying to said voltage responsive device the resultant of the thermo-couple voltages and an adjustable portion of the constant voltage across said gaseous discharge device whereby the voltage applied to the grid and consequently the operation of the motor is controlled in accordance with the combined voltage of said thermo-couples and whereby the amount of heat necessary to apply to said balancing thermo-couple to maintain a desired grid voltage is adjusted by adjusting the portion of the voltage across the gaseous discharge device that is applied to said voltage responsive device.

10. In a motor control system; a motor; a space discharge amplifier comprising an anode, a cathode, and a control grid; an alternating current source of power connected in the anode circuit of said amplifier; means for controlling the motor in accordance with the output current in said anode circuit; a gaseous discharge device and an impedance connected in series across said anode circuit, said gaseous discharge device being of a type having a uniform potential drop thereacross regardless of the current flowing therethrough; and means for applying between the grid and cathode of said amplifier a voltage determined by a controlling circuit including a main controller and a desired portion of the constant direct current voltage across said gaseous discharge device.

11. In a follow-up control system; a motor; a space discharge amplifier comprising an anode, a cathode, and a control grid; an alternating current source of power connected in the anode circuit of said amplifier, means for controlling the motor in accordance with the output current in said anode circuit; a gaseous discharge device and an impedance connected in series across said anode circuit, said gaseous discharge device being of a type having a uniform potential drop thereacross regardless of the current flowing therethrough; and means for applying between the grid and cathode of said amplifier a voltage determined by a controlling circuit including a main controller, a follow-up controller adjusted by the motor, and a desired portion of the constant direct current voltage across said gaseous discharge device.

HUBERT T. SPARROW.